United States Patent
Hickman

(10) Patent No.: US 8,923,547 B2
(45) Date of Patent: Dec. 30, 2014

(54) GEOTAGGING OF AUDIO RECORDINGS

(75) Inventor: Howard Oliver Hickman, Reigate (GB)

(73) Assignee: U-Blox A.G., Thalwil (CH)

( * ) Notice: Subject to any disclaimer, the term of this patent is extended or adjusted under 35 U.S.C. 154(b) by 491 days.

(21) Appl. No.: 13/183,388

(22) Filed: Jul. 14, 2011

(65) Prior Publication Data
US 2013/0004014 A1    Jan. 3, 2013

(30) Foreign Application Priority Data
Jun. 30, 2011  (EP) .................................... 11172258

(51) Int. Cl.
 *G06K 9/00*   (2006.01)
 *G06F 17/30*  (2006.01)
(52) U.S. Cl.
 CPC ............................. *G06F 17/30749* (2013.01)
 USPC ...................................................... 382/100
(58) Field of Classification Search
 USPC ...................................................... 382/100
 See application file for complete search history.

(56) References Cited

U.S. PATENT DOCUMENTS

| | | | | |
|---|---|---|---|---|
| 6,205,399 | B1 * | 3/2001 | Ogino et al. | 701/521 |
| 6,282,362 | B1 | 8/2001 | Murphy et al. | |
| 7,659,848 | B2 | 2/2010 | Dooley et al. | |
| 2005/0273491 | A1 * | 12/2005 | Meyer et al. | 709/203 |
| 2006/0071918 | A1 * | 4/2006 | Mori et al. | 345/184 |
| 2011/0009159 | A1 | 1/2011 | Muzina et al. | |

OTHER PUBLICATIONS

Nisson, M., *ID3v2.3.0 Informal Standard*, http://www.id3.org/id3v3.3.0, Feb. 3, 1999, pp. 1-36.

* cited by examiner

*Primary Examiner* — Alex Liew
(74) *Attorney, Agent, or Firm* — Blakely Sokoloff Taylor & Zafman

(57) ABSTRACT

A method of geotagging an audio-recording. The method comprises: determining (220) a location at which the audio-recording was recorded; obtaining (230) an image containing an indication of the location, or a reference to a file containing such an image; and creating (215, 240) a single file (1) containing: the audio-recording (4); and the image (8) or a reference to a separate file that contains the image. The indication of the location comprises at least one of: a map (8a) that includes the location; an aerial or satellite photograph that includes the location; and text (8b) overlaid on the image to specify the location.

12 Claims, 4 Drawing Sheets

GEOTAGGING OF AUDIO RECORDINGS

This invention relates to annotating audio recordings with information about one or more locations at which the audio recording was made. It is particularly relevant to file-formats which permit audio and image data to be stored together in a single file.

A variety of digital audio formats exist. One of the most popular and widely adopted is based on the MPEG-1 or MPEG-2 Audio Layer 3 standard. It is commonly referred to by its associated filename extension: "MP3". Other audio file-formats include other international standards, such as Advanced Audio Coding (AAC); proprietary standards, such as Windows Media Audio (WMA); and freely available codecs, such as the Free Lossless Audio Codec (FLAC).

It is known to provide metadata in an audio file in order to describe the audio content. Audio files are often used for music, and much of the metadata associated with audio file-formats is influenced by this use. For example, it is typical to provide metadata elements (fields, or "tags") for information such as Artist Name, Track Number, Track Title, and Album Title.

"ID3v2" is an informal standard for a metadata container that is commonly used with the MP3 format, and some other audio file-formats. Like MP3 itself, ID3v2 has been widely adopted. Other audio file types may use different metadata formats. For example, the Advanced Systems Format (ASF) can be used as a container for WMA files together with associated metadata.

However, conventional metadata specifications, such as ID3v2 and others, provide little support for metadata descriptions other than those that are useful for music recordings. In particular, there is little or no provision for describing the location at which a sound recording has been made.

According to an aspect of the present invention, there is provided a method of geotagging an audio-recording, comprising:
  determining a location at which the audio-recording was recorded;
  obtaining an image containing an indication of the location, or a reference to a file containing such an image; and
  creating a single file containing:
  the audio-recording; and
  the image or a reference to a separate file that contains the image,
  wherein the indication of the location comprises at least one of: a map that includes the location; an aerial or satellite photograph that includes the location; and text overlaid on the image to specify the location.

A reference to a file containing the image may be an address from which the image can be retrieved, such as a URL of the image.

Obtaining the image may comprise generating the image. Alternatively, the image may be generated externally to the present method and either the image (or a reference to it) may be obtained by a device implementing the present method. That is, the device generating the image and the device creating the single file may be the same device or different devices.

In the event that the method is performed at the same time as the audio is being recorded, the step of determining the location may comprise using a positioning system, such as a GPS receiver, to establish the location. Alternatively, in the event that the method is performed later (after the audio has been recorded) the step of determining the location may comprise reading a previously established location. For example, the location may be provided in metadata of a file containing the audio, or otherwise associated with the audio.

An aerial photograph including the location is preferably a vertical aerial photograph—that is, a plan-view photographic image taken by a camera pointing approximately vertically downward on the location. The same is true for a satellite photograph of the location. Both of these overhead photographic representations share with a map the characteristic that it is possible to uniquely identify points in two dimensions (on the earth's surface) by reference to the image. It is also possible to navigate in the area of the recording-location by reference to the map or aerial/satellite photograph.

A map can be defined as a symbolic graphical representation of geographic features (as opposed to a photographic representation). It is also possible to combine map and photographic representations (for example by overlaying symbols such as roads on an aerial photograph). Thus, it is possible for a single image to comprise both a photograph and map.

Preferably, the map or photograph contains a mark identifying the position of the location on the map or photograph. A mark (or symbol) on an overhead view of the area will typically be immediately intelligible to a user as an indication of the recording-location. It is also particularly useful as an aid if the user is trying to find the way to the location.

Preferably, the image is embedded within the file. This avoids the potential problem of the image file and audio recording becoming separated or a link to the image file becoming stale.

According to a preferred embodiment, there is provided a method of geotagging an audio-recording with a location at which it was recorded, comprising:
  generating an image containing an indication of the location; and
  creating a single file containing the audio-recording and the image,
  wherein the indication of the location comprises a map of the location and/or text overlaid on the image to specify the location.

Storing the location at which audio was recorded is useful in many applications—even though it may not obviously be useful for music tracks. For example, it would be desirable in many applications to annotate voice memos or dictated notes with a location of capture. Other types of location-specific audio may include sound recordings of wildlife (for example, birdsong) for scientific, conservation, or recreational purposes.

It would be possible to develop specialised or proprietary forms of metadata to accommodate this need to describe location. However, such metadata would depart from the already widely adopted norms and standards—leading to incompatibility with existing devices and software. The most that could be hoped for is that these existing tools—which would not be programmed to understand the specific location metadata—would simply ignore it. This might occur, for example, if the metadata was embedded in a text field reserved for "comments". However, this would still present a problem, because accessing the location metadata using the existing tools would be difficult and non-intuitive.

The present invention avoids these problems, by embedding the location metadata in a picture. The present inventors have recognised that, because audio file-formats have been used conventionally for storing music, it is relatively common to support the embedding in the audio file of one or more images that are intended to contain album artwork. Alternatively, links to one or more such images may be embedded in the audio file. In either case, these metadata elements can be exploited to provide a solution to the problem of geotagging audio files. (Geotagging means adding metadata identifying a geographical location to a digital media item.)

The present solution fits well with the ways that embedded image metadata and linked images are conventionally processed by devices and software handling audio files. For example, it is typical for a device to display an image of album artwork on a display-screen when playing a music track. Likewise, software such as a computer operating system may use the image as an icon to represent the file in a file-system. In both cases, the present invention has the effect that the location of recording is visually indicated to a user (in the place of the artwork for a music track). Thus, the present invention provides for a convenient and intuitive representation of location, in a manner that is backwards compatible with existing standards, hardware and software. In addition, little extra effort is required. In many cases, a metadata field that would otherwise be left empty or unused is utilized. This is because no album art is available or relevant for many types of audio recording.

The overlay-text may comprise position coordinates in textual form; a reverse-geocoded address; or both. (Reverse geocoding is the process of converting location coordinates into a human-readable address or place name.) The text may be overlaid on a plain background; on a photograph; or, if the image includes a map of the location, on that map. Thus, in this context, "overlaying" text means rendering textual characters in the image, such that they are visible when the image is viewed.

The image may be a mosaic comprising a first portion having a uniform or plain background, on which text is overlaid and a separate map portion. This avoids the text-overlay occluding visual features of the map. It can also improve readability of the text by ensuring good contrast between text and background.

Preferably, the single file is formatted according to a digital audio file-format.

One group of suitable audio file-formats are those which permit embedding of an image as part of the metadata. These may include, but are not limited to MP3, AAC, WMA (at least when contained in an ASF file), Audio Interchange File Format (AIFF), MPEG-4 Audio (M4A), and MPEG-4 Audio Book File (M4B). Another group comprises file-formats which permit embedding of a link (reference) to such an image.

Some file-formats may support both direct embedding of images and embedding of links to images. For example, it has been proposed to add a field named METADATA_BLOCK_PICTURE to the VorbisComment metadata format, which is intended for use with the Vorbis codec in the Ogg container format. The proposed field allows images to be linked or embedded, according to user preference.

The image may be embedded in a portion of the audio file-format reserved for metadata.

In particular, the image may be embedded in a portion of metadata reserved for album artwork such as a front or back cover. Suitable types of metadata may include ID3v2 tags and Vorbis comments, among others.

The file may be an MP3 file and the image is embedded in an "Attached Picture" (APIC) frame according to the ID3v2 specification.

The ID3v2 specification defines the APIC frame as containing a picture that is directly related to the audio file. Embedding an image containing a description of the location of capture is therefore consistent with the informal standard. According to the specification, the APIC should be embedded as a Joint Photographic Experts Group (JPEG) or Portable Network Graphics (PNG) file. JPEG album-art embedded in this way is widely supported in MP3 player software and hardware, for example.

In other embodiments, the single file may contain a reference to the image. In this case, the reference may comprise a link to an (electronic) address from which the image may be obtained. This link may be, for example, a local file address or a URL to enable the image to be obtained via the internet.

Embedding only a link to the image may have a benefit if the total size of the single file is of critical concern. Embedding the actual image data tends to increase the file-size.

The location at which the audio-recording was recorded may also be described in one or more textual or numerical metadata tags of the file.

It is preferable to provide the location in machine readable form as well in visual, human-readable form. Additionally describing the location in textual or numerical fields achieves this. By way of example, the description may comprise an address, place name, or geographic coordinates such as latitude and longitude or a grid reference.

The file may be an MP3 file and the location may be described in a Unique File Identifier frame according to the ID3v2 specification.

The "Unique File Identifier" (UFID) frame declared in the ID3v2 specification provides two parts: an "Owner Identifier", which is a text string containing a Uniform Resource Locator (URL); and the actual "Identifier", which may be up to 64 bytes of binary data. The Owner Identifier identifies the organisation responsible for the database. If the Identifier contains geographic location coordinates, the Owner Identifier can act as a label, enabling the device or software program consuming the audio file to correctly interpret (or to discover how to correctly interpret) the Identifier.

The image may be provided as a JPEG file and the location at which the audio-recording was recorded is preferably described in one or more EXIF metadata tags of the JPEG file.

The Exchangeable Image File Format (EXIF) defines a way to embed metadata in JPEG images. It provides standard tags for location information. Since the JPEG is embedded within the audio file, this allows the location information to be provided in the audio file in a standardised, machine readable form (as well as being visible to a user in the image). Conventionally, EXIF metadata would be expected to describe the location of the camera which has taken a photograph. However, in the present example, the EXIF metadata is used instead to describe a location within the scene depicted in the map or photograph, which is the recording-location of the audio recording. In the present case, this is generally different from the location at which the photograph was taken (for the case of an aerial or satellite photo).

The location of recording may have changed during the course of the recording, and the indication of the location may describe at least one of: a plurality of discrete locations; a location-range, or a trajectory.

For example, the indication of the location may indicate a plurality of specified points visited by the device which recorded the audio. The points may be marked on the map and/or listed in a textual overlay on the image. The points preferably include at least start and end points corresponding to the locations of the device at the start and ending of the audio recording. The indication of the varying recording location may equally by described by coordinates of a representative point-location, together with a range of variation about the point. The representative point may be an average or central position of the range of locations visited, or may be a start or end point. Equally the image may contain an indication of a trajectory that was followed by the recording-device while the recording was being made. This may be indicated by a (straight or curved) line drawn on the map, tracing the route taken.

According to another aspect of the invention there is provided a method of geotagging an audio-recording with a location at which it was recorded, comprising:
creating a digital audio file containing the audio-recording; and
describing the location in one or more metadata tags of the digital audio file,
wherein the audio file is an MP3 file and the location is described in a Unique File Identifier frame according to the ID3v2 specification.

Among the different possible metadata elements that could be used, the use of the Unique File Identifier to store location information is particularly advantageous, as explained previously, above.

Also provided is a computer program comprising computer program code means adapted to perform all the steps of any preceding claim if said program is run on a computer, and such a computer program embodied on a computer readable medium.

According to a further aspect of the invention, there is provided a digital audio file comprising: an audio-recording; and an image or a reference to a separate file that contains an image, wherein the image comprises at least one of: a map that includes a location at which the audio-recording was made; an aerial or satellite photograph that includes the location; and text overlaid on the image to specify the location.

According to preferred embodiments, there is provided a digital audio file comprising an audio-recording and an image, wherein the image comprises a map indicating a location at which the audio-recording was made and/or graphical text which specifies the location.

The text is graphically (and visibly) represented on the image—as distinct from, for example, merely using a textual representation in metadata of the image.

According to another aspect of the invention, there is provided a digital audio file comprising an audio-recording and at least one metadata tag, wherein the tag describes a location at which the audio-recording was made, and wherein the audio file is an MP3 file and the location is described in a Unique File Identifier frame according to the ID3v2 specification.

These audio files are preferably embodied on computer readable media, which include (but are not limited to) volatile or non-volatile memory circuits; optical discs such as CD or DVD; or magnetic storage media such as a hard-disk or tape.

According to yet another aspect of the invention, there is provided an apparatus for geotagging an audio recording, the apparatus comprising:
a memory for storing the audio recording; and
a processor, adapted to:
determine a location at which the audio recording was made;
generate obtain an image indicating the location or a reference to a file containing such an image; and
create, in the memory, a single file containing:
the audio-recording; and
the image or a reference to a separate file that contains the image,
wherein the image indicates the location by means of at least one of: a map that includes the location; an aerial or satellite photograph that includes the location; and text overlaid on the image to specify the location.

Still another aspect of the invention provides an apparatus for geotagging an audio recording comprising:
a memory for storing the audio recording; and
a processor, adapted to:
determine a location at which the audio recording was made; and
create, in the memory, a digital audio file containing the audio-recording and one or more metadata tags describing the location,
wherein the audio file is an MP3 file and the location is described in a Unique File Identifier frame according to the ID3v2 specification.

The invention will now be described by way of example with reference to the accompanying drawings, in which.

The present inventors have recognised that it is possible to embed information identifying or indicating a recording-location in a digital audio file, in visual form—that is, it is possible to geotag the audio file using visual metadata. This allows easy presentation of the location information to a user, as well as offering backward compatibility with many existing hardware devices and software programs that are used to consume digital audio.

Figure 1:
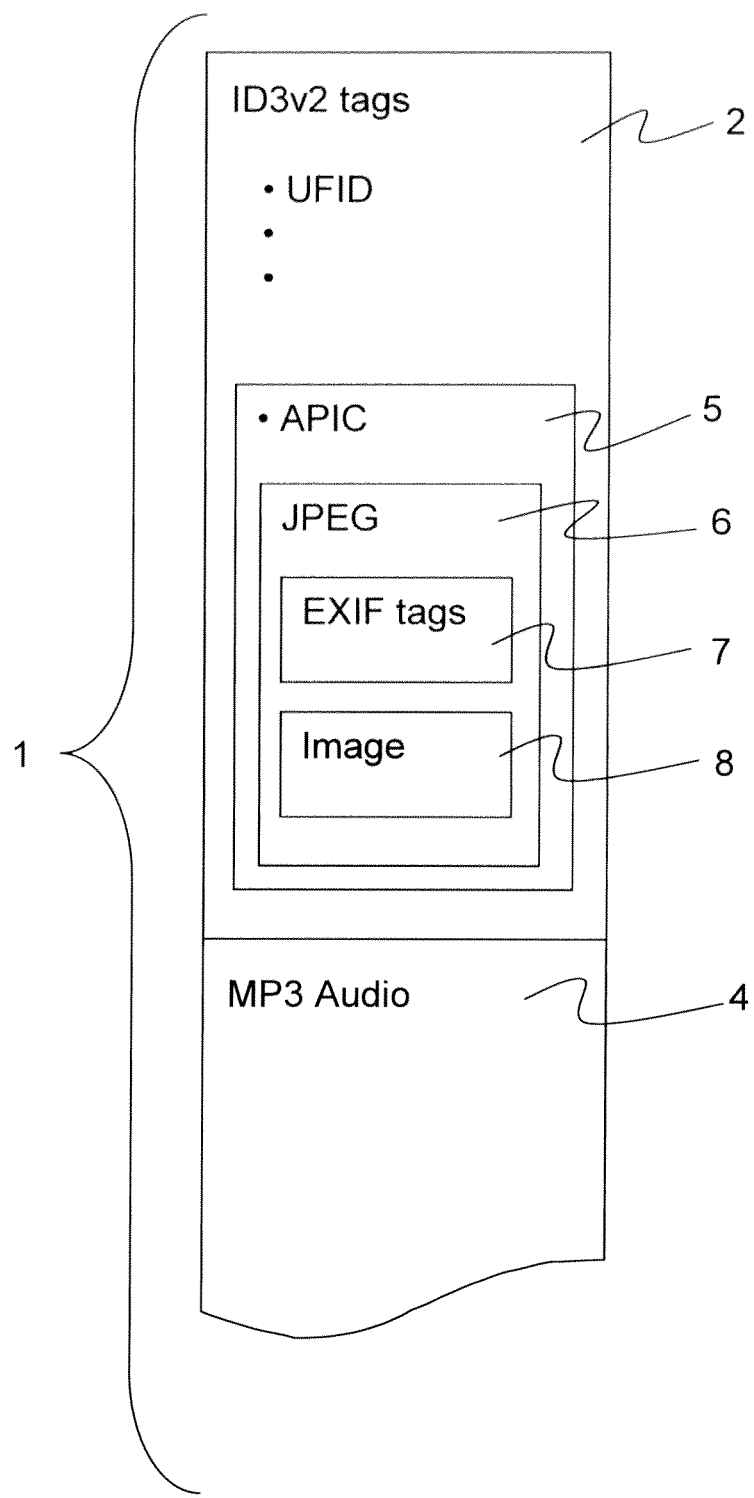
FIG. 1 illustrates an example of the structure of an audio file containing an embedded image which indicates a location, according to an embodiment of the invention.

FIG. 1 illustrates a file-structure which can be used when embedding a visual indication of location in an audio file, according to a preferred embodiment of the invention. A digital audio file 1 is provided in the widely adopted MP3 format. The file 1 comprises lossy-compressed audio 4, encoded according to the MP3 standard. ID3v2 tags 2 are included at the start of the audio file 1. These tags include at least one attached picture (APIC) frame 5, which contains a JPEG image file 6. Inside the JPEG file 6 are the compressed image data 8 and EXIF tags 7. The ID3v2 metadata also includes one or more UFID tags and optionally other tags, as indicated by the blank bullet points in the list below "UFID".

Note that in the example of FIG. 1, the ID3v2 metadata is at the start of the file. Although this may be preferred (for example, for streaming applications), it is not essential. As an alternative, it is possible to append ID3v2 metadata at the end of a file.

The content of the image 8 visually indicates the location of recording of the MP3 audio data, in two ways. Firstly, the recording-location is marked on a map. Any convenient form of marking may be used, such as a dot, star or cross, or an arrow pointing at the location on the map. Secondly, a text caption is provided in the image. The caption is rendered as overlayed text and is preferably provided in a separate segment of the image—for example a region of blank background above or below the map-image. This helps to ensure that both the map and the text caption are easily readable and do not interfere with one another. The textual caption can consist of geographic coordinates (latitude and longitude) of the recording-location; a postal address or place name of the location; or both.

When the audio file 1 is processed by software or hardware, the image 8 may be decoded from the ID3v2 metadata and displayed. For example, a conventional media player may display the image while the audio recording is being played (in the same way that album art is displayed for music tracks). The image 8 may also be displayed as the file icon for the audio file 1, by file-management software in a computer operating system. This allows a convenient and easily understandable presentation of the recording-location to a user, in a Graphical User Interface (GUI).

In addition, the location is encoded in machine-readable form elsewhere among the metadata. In the present example, the location is written to geographic location tags in the EXIF portion 7 of the JPEG file 6. The coordinates are also used as the Identifier in the Unique File Identifier frame (UFID) of the ID3v2 tags. The Owner Identifier part of the UFID contains a link to a database which can interpret the coordinate information in the identifier. By providing the location information also in machine-readable form, further automatic processing based on position is enabled.

Figure 2:
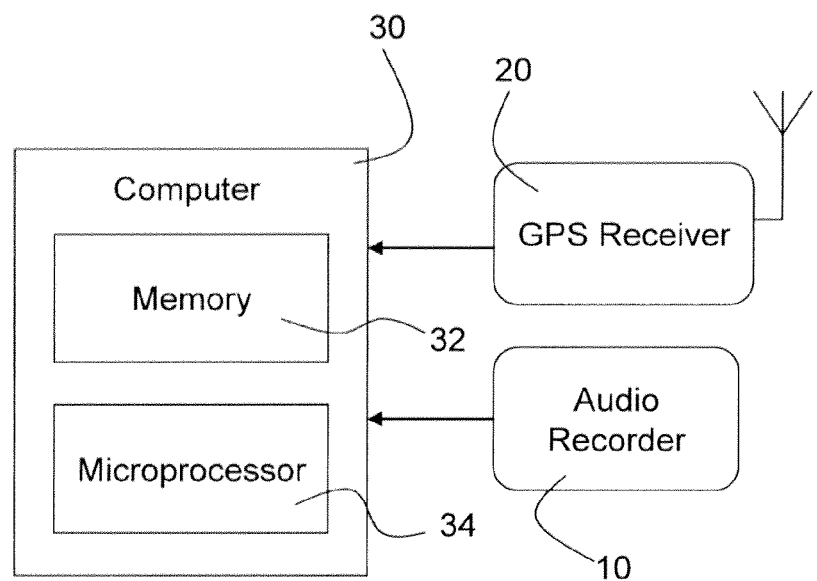
FIG. 2 is a block diagram of a group of hardware devices arranged to operate in accordance with an embodiment of the invention.

FIG. 2 is a block diagram of an arrangement of devices according to an embodiment of the invention. An audio recorder 10, such as a digital dictaphone, is carried by a user in the field. A separate (external) GPS receiver device 20 is also carried by the user. When the user dictates an audio memo, the audio recorder generates an MP3 file containing the encoded audio content and annotates this with the time of recording. This annotation may be provided by the date and time of creation of the audio file; alternatively, the date and time may be embedded in the metadata of the audio file; or both.

Meanwhile, the GPS receiver 20, which is not coupled to the audio recorder 10, maintains a log of the locations visited by the user. The GPS device 20 does this by periodically receiving signals from GPS satellites and processing them to obtain a position fix. Each position fix is annotated with the corresponding time at which the receiver 20 was at that position. The result is a log of discrete positions and associated time stamps.

Later, the user connects both the audio recorder 10 and the GPS receiver 20 to a personal computer 30. The audio file is uploaded to the memory 32 of the computer by the audio recorder 10 and the GPS track log is uploaded to the memory 32 by the GPS receiver 20. The processor 34 of the computer is programmed to determine the location of recording of the audio file by comparing the time-stamp of the audio recording with the time-stamps in the GPS track log. Interpolation between the GPS position fixes may be used if the fixes are widely separated in space and/or time. Note that similar methods to this are known in the art for geotagging of digital photographs. Those skilled in the art will understand that these methods can be adapted for geotagging of audio files according to the present invention.

Once the recording-location of the audio file has been established, the computer 30 is controlled to generate a map indicating the location. A suitable image can be synthesised either by using data in a map database stored internally, in the memory 32 of the computer; or the computer 30 may request a map image from a remote/external provider. Methods for generating or retrieving a map image based on specific geographic location coordinates will be familiar to those skilled in the art. The computer 30 also renders a description of the location as overlay-text on a separate part of the image. For example, a caption-bar may be added above or below the map. The rendered textual description of the location may include the location coordinates, a reverse-geocoded address or place name, or both.

In the first embodiment, described above, the GPS receiver 20 is a fully functional, real-time GPS receiver. That is, it is adapted to receive GPS signals, process them, and produce a position fix (for example, latitude and longitude coordinates) in real time. It is also known in the art to provide a GPS receiver which receives GPS signals; samples them to produce GPS signal samples; and stores these samples locally, for later processing. This type of receiver—known as a "store and process later" or "capture and process" receiver—may have advantages of longer battery life and reduced cost and complexity, compared with a real-time GPS receiver. This is because the capture and process receiver does not need to implement the computationally intensive processing necessary to detect individual satellite signals; calculate pseudoranges to these satellites; and process these pseudoranges using a trilateration calculation, to produce a position fix.

The embodiment of the invention illustrated in FIG. 2 is equally applicable if the GPS receiver 20 is a capture and process GPS receiver. In this case, the processor 34 of the computer 30 will perform final processing of the stored GPS signal samples, after these have been uploaded from the GPS receiver. That is, the GPS track log will consist instead of sets of GPS signal samples and associated time-stamps. Note that a suitable method for determining the location of an event, for use with a capture and process GPS receiver, has been described in U.S. Pat. No. 7,659,848. Those skilled in the art will now understand that this method can be employed in an embodiment of the present invention, to determine the location at which an audio recording was made.

Figure 3:
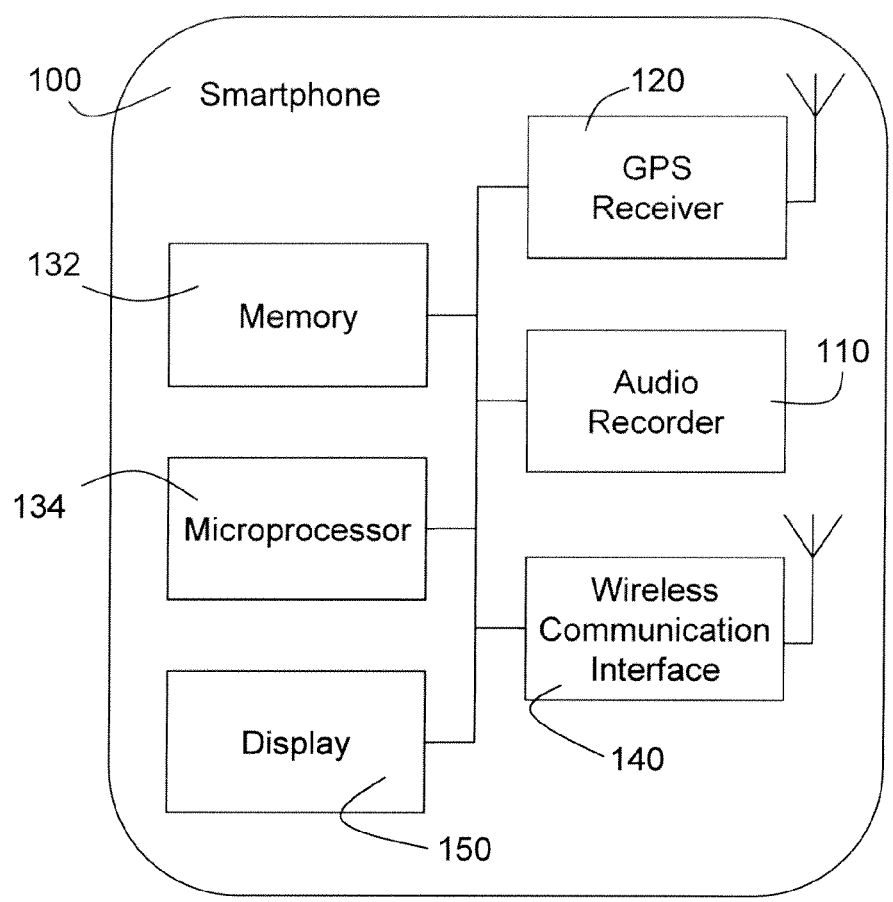
FIG. 3 is a block diagram of a smart-phone adapted to operate in accordance with a second embodiment.
Figure 4:
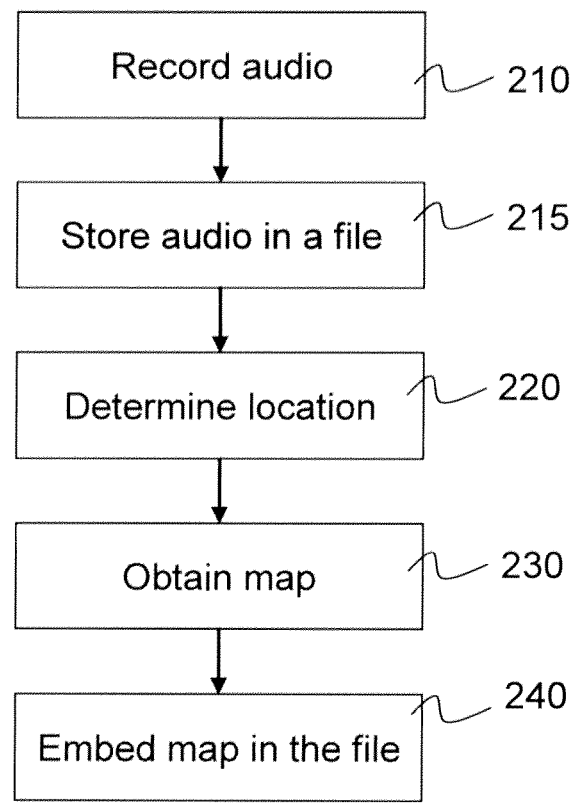
FIG. 4 is a flow-chart of a method according to an embodiment

FIG. 3 shows a block diagram of a smart phone 100 suitable for implementing another embodiment of the invention. The primary difference between this embodiment and that of FIG. 2 is that, in the smart phone 100, all of the components are integral to the device. This embodiment will now be described with reference to FIG. 3 and the flow chart of FIG. 4, which illustrates a method according to the embodiment.

Audio recording unit 110 records 210 an audio signal, under the control of the microprocessor 134. The recorded audio is stored 215 in a file in the memory 132. The activation of the audio recorder 110 also triggers the GPS receiver 120 to determine 220 the current location of the smart phone 100. Based on the location determined by the GPS receiver 120, the microprocessor 134 controls the wireless communication interface 140 to make a request to a remote map database server (not shown). Any suitable wireless communications link may be used—including, but not limited to, a wireless LAN connection, cellular data connection such as GPRS or 3 G mobile internet connection, etc.

A map-image is retrieved 230 from the map-database server. The processor 134 in the smart phone 100 adds a visual annotation, by rendering the location coordinates as graphical text on the image. Optionally, the processor 134 may control the wireless communications interface 140 to contact a reverse-geocoding service. This enables the location coordinates to be converted to a place name or address. This textual information can also be rendered graphically on the image. Once the annotated map has been generated and obtained 230 by the smartphone 100, it is added to the audio file 1, stored in the memory 132. The embedding 240 of the map in the audio file 1 is as described above, with reference to FIG. 1.

Note that, in other embodiments of the invention, it is possible to store more than one location for each audio file. This may be appropriate, for example, if the user who made the audio recordings was moving while recording. In this case, the audio file is not associated merely with a single unique location. Rather, a trajectory of the user's movements describes the location of capture. This can be represented in the image 8 in a variety of ways. Several discrete positions, measured by the GPS receiver 20 or 120 in the course of the recording, may be marked on the map and/or listed in the graphical caption. Alternatively, a line marked on the map may be used to trace the actual path followed by the user. Another solution may be to indicate only the estimated position of the device at the time the recording started and at the time it ended. Alternatively or in addition, the plurality of positions may be converted to a numerical range of coordinates. Equally, the textual annotation may be selected so as to describe this range—for example, a set of positions or range of locations which are all in the same city may be annotated by the name of that city.

One practical example of an audio recording associated with multiple locations is a guided tour. It would be desirable for an audio recording of the commentary to be correlated with associated locations for each part of the commentary. For example, on a bus-tour a tour guide usually introduces the various locations traversed by the bus. It would be advantageous to have a recording of the complete tour along with positioning information for each site visited. Later, the positions could be matched with corresponding recording segments, by comparing timestamps.

Figure 5:
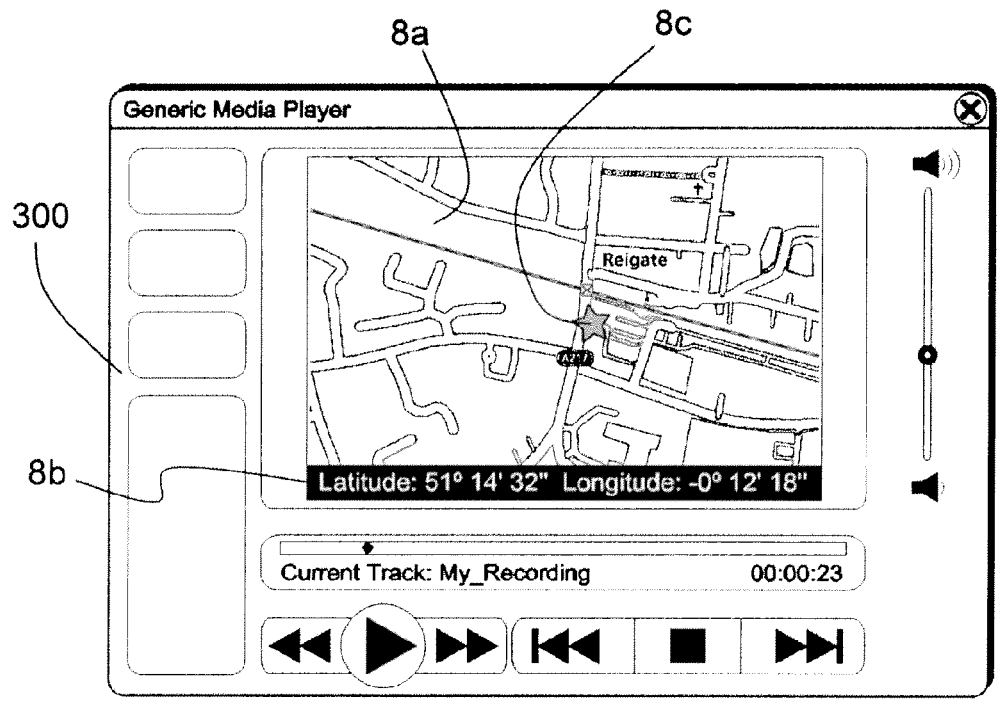
FIG. 5 illustrates the user interface of a media player when playing a file according to an embodiment of the invention.
Figure 6:
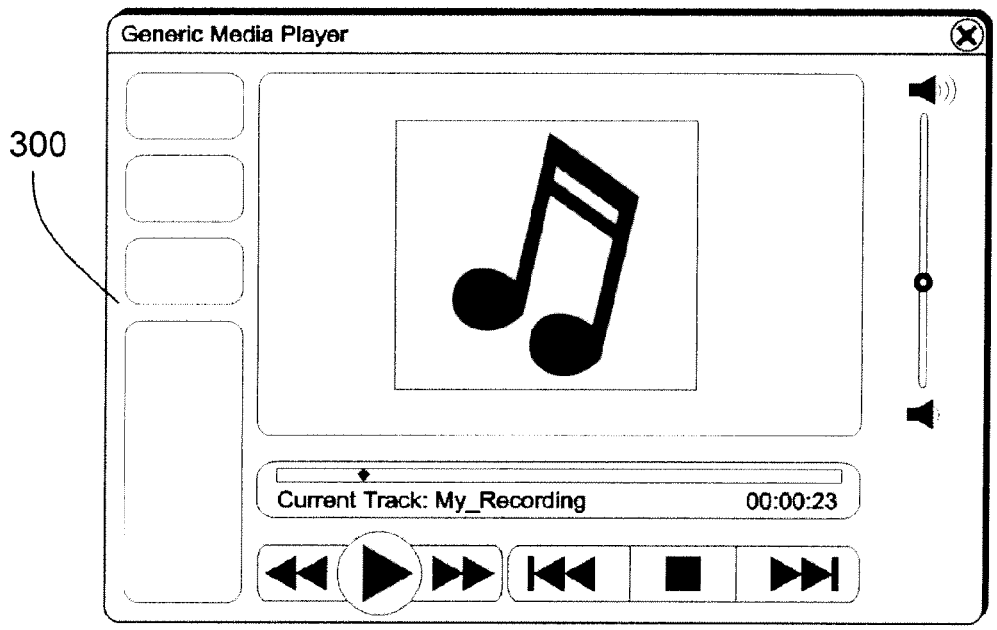
FIG. 6 illustrates the user interface of the same media player when playing an audio recording according to a comparative example.

FIGS. 5-6 illustrate the utility of an embodiment of the present invention. FIG. 5 shows the Graphical User Interface (GUI) of a multimedia player 300, while it is playing an audio file 1 formatted according to an embodiment. This GUI may be displayed, for example, on a display 150 of the smartphone 100 described above, or on a Visual Display Unit (VDU) of a personal computer. The media player software reads the image embedded in the file 1 and displays it on screen. This is done in the same way that an album cover would be displayed for a conventional music track. Indeed, the media player 300 need not even be aware that the image displayed is not a piece of album-art. The image contains a map 8a showing the location at which the audio recording was made. The actual location is written on the image in overlaid text in a caption bar 8b at the bottom edge of the map 8a. This specific location is also indicated on the map by a star symbol 8c, marking the location. Providing the image 8 with the audio recording enables the media player 300 to show the user where the audio recording was made, without requiring modification of the media player. This is particularly useful, for example, in cases where the audio recording relates to location-specific observations. One such type of observation may be a voice-memo recorded during the inspection of a (static) object or device, such as an item of street furniture. It is then highly desirable to be able to reliably and easily navigate to the same location (for example, for repair or re-inspection). This is accomplished by the embodiment of FIG. 5.

In contrast, FIG. 6 shows a comparative example, in which no image has been provided in (or linked to) the audio file. The media player 300 now displays a generic icon, conveying no additional information to the user.

While the invention has been illustrated and described in detail in the drawings and foregoing description, such illustration and description are to be considered illustrative or exemplary and not restrictive; the invention is not limited to the disclosed embodiments.

In particular, the invention is not limited to the use of the specific standard formats used in the exemplary embodiments. This includes the format of the digital audio file (whether lossy or lossless compression—or neither—is used), the format of the metadata and the format of the image embedded in the audio file. It is preferable to adopt a format that is formally or informally standardised or in common use, to facilitate interoperability. The skilled person will understand that different types of metadata are suitable for and/or intended for use with different audio file types. It will be preferably to use these intended combinations, to ensure the widest possible interoperability with other devices and software programs.

Nevertheless, in general, the image may be embedded in the same file as the audio recording in any desired manner.

In the embodiment of FIG. 2, the GPS receiver 20 is shown as a separate device from the audio recorder 10. Of course, in another, similar embodiment, the GPS receiver 20 and audio recorder 10 could be integrated in a single product.

Embodiments of the invention may be implemented in distributed form, using different physical electronic devices and/or computing devices. For example, an audio recorder and GPS receiver may cooperate to create a digital audio file with embedded location metadata describing a location at which the recording was made. This metadata may be inserted in the audio file using suitable textual or numerical fields (such as the ID3v2 tag "UFID", described already above). The digital audio file may then be delivered to another device such as a computer, which may be a server computer. The server computer may be configured to parse the UFID tag, read the location coordinates, and to generate a suitable image graphically showing the location. This image may be embedded in the audio file by the server. Alternatively, the server may embed a link to the image. As another alternative, the audio file and the image may be returned to a client device (similar to the smartphone 100 of FIG. 3) as separate files. The smartphone can then either embed the image in the audio file or embed a link to the image in the audio file, according to preference. In these examples, a method according to an embodiment of the invention is performed by the various devices cooperating.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of geotagging an audio-recording, comprising:
    determining (220) a location at which the audio-recording was recorded;
    obtaining (230) an image containing an indication of the location, or a reference to a file containing such an image; and
    creating (215, 240) a single file (1) containing:
        the audio-recording (4); and
        the image (8) or a reference to a separate file that contains the image,
    wherein the indication of the location comprises at least one of:
        a map (8a) that includes the location;
        an aerial or satellite photograph that includes the location; and
        text (8b) overlaid on the image to specify the location.

2. The method of claim 1, wherein the indication of the location comprises a map (8a) or an aerial or satellite photograph including the location, and
the map or photograph contains a mark (8c) identifying the position of the location on the map or photograph.

3. The method of claim 1, wherein the image (8) is contained in a portion (2) of the single file (1) reserved for metadata.

4. The method of claim 3, wherein the file (1) is an MP3 file and the image (8) is embedded in an Attached Picture frame according to the ID3v2 specification.

5. The method of claim 1, wherein the location at which the audio-recording was recorded is also described in one or more textual or numerical metadata tags of the single file.

6. The method of claim 5, wherein the single file is an MP3 file and the location is described in a Unique File Identifier frame according to the ID3v2 specification.

7. The method of claim 1, wherein the image (8) is provided as a JPEG file (6) and the location at which the audio-recording was recorded is also described in one or more EXIF metadata tags (7) of the JPEG file (6).

8. The method of claim 1, wherein the location of recording changed during the course of the recording, and wherein the indication of the location describes at least one of:
a plurality of discrete locations;
a location-range, or a trajectory.

9. A non-transitory computer readable medium, having embodied on it a computer program comprising computer program code means adapted to control a computer to perform all the steps of claim 1 if said program is run on the computer.

10. A non-transitory machine-readable medium, having embodied on it a digital audio file (1) comprising an audio-recording (4) and an image (8) or a reference to a separate file that contains an image, wherein the image comprises at least one of:
a map (8a) that includes a location at which the audio-recording was made;
an aerial or satellite photograph that includes the location; and
text (8b) overlaid on the image to specify the location.

11. Apparatus for geotagging an audio recording, the apparatus comprising:
a memory (32, 132) for storing the audio recording; and
a processor (34, 134), adapted to:
determine a location at which the audio recording was made;
obtain an image (8) indicating the location or a reference to a file containing such an image; and
create, in the memory (32, 132), a single file (1) containing:
the audio-recording (4); and
the image (8) or a reference to a separate file that contains the image,
wherein the image indicates the location by means of at least one of: a map (8a) that includes the location; an aerial or satellite photograph that includes the location; and text (8b) overlaid on the image to specify the location.

12. Apparatus for geotagging an audio recording comprising:
a memory (32, 132) for storing the audio recording; and
a processor (34, 134), adapted to:
determine a location at which the audio recording was made; and
create, in the memory, a digital audio file (1) containing the audio-recording (4) and one or more metadata tags (2) describing the location,
wherein the audio file is an MP3 file and the location is described in a Unique File Identifier frame according to the ID3v2 specification.

* * * * *